United States Patent
Lim et al.

(10) Patent No.: US 7,519,840 B2
(45) Date of Patent: Apr. 14, 2009

(54) APPARATUS AND METHOD FOR CONTROLLING A SUSPENDING MODE IN A USB CONTROL SYSTEM

(75) Inventors: Choong-Bin Lim, Yongin-si (KR); Sang-Jun Mun, Incheon-gwangyeoksi (KR)

(73) Assignee: Samsung Electronics. Co., ltd., Suwon-si, Gyeonggi-do (KR)

( * ) Notice: Subject to any disclaimer, the term of this patent is extended or adjusted under 35 U.S.C. 154(b) by 437 days.

(21) Appl. No.: 11/330,944

(22) Filed: Jan. 12, 2006

(65) Prior Publication Data
US 2006/0190748 A1 Aug. 24, 2006

(30) Foreign Application Priority Data
Feb. 18, 2005 (KR) .................... 10-2005-0013625

(51) Int. Cl.
*G03B 17/48* (2006.01)
(52) U.S. Cl. .................. 713/300; 713/310; 713/320; 713/321; 713/322; 713/323; 713/324; 713/330; 713/340; 323/205; 323/318
(58) Field of Classification Search ............. 713/300, 713/310, 320–324, 330, 340; 323/205, 318
See application file for complete search history.

(56) References Cited

U.S. PATENT DOCUMENTS 5,774,813 A * 6/1998 Jokinen .................. 455/574
5,973,484 A * 10/1999 Cho ...................... 323/269
6,385,119 B2 * 5/2002 Kobayashi et al. ......... 365/227
7,064,534 B2 * 6/2006 McClure et al. ........... 323/314
7,372,500 B2 * 5/2008 Watanabe et al. .......... 348/372
2003/0026614 A1 2/2003 Watanabe et al.

FOREIGN PATENT DOCUMENTS

| JP | 11194847 | 7/1999 |
| JP | 20000224450 | 8/2000 |
| KR | 19990040828 | 6/1999 |

OTHER PUBLICATIONS

English Abstract.

* cited by examiner

*Primary Examiner*—Abdelmoniem Elamin
(74) *Attorney, Agent, or Firm*—F. Chau & Associates. LLC

(57) ABSTRACT

A USB control system includes a first voltage controller, a control switch, a second voltage controller, and a PHY unit. The first voltage controller outputs a first internal voltage from an external voltage and a reference voltage, and the control switch regulates supplying and suspending the external voltage. The second voltage controller outputs a second internal voltage from the reference voltage and the external voltage applied through the control switch, and the PHY unit receives a request from a host using the first or second internal voltage as a voltage source. The power for certain internal blocks is suspended to reduce power consumption in the USB control system during a power-saving mode.

24 Claims, 4 Drawing Sheets

APPARATUS AND METHOD FOR CONTROLLING A SUSPENDING MODE IN A USB CONTROL SYSTEM

CROSS-REFERENCE TO RELATED APPLICATIONS

This U.S. non-provisional patent application claims priority under 35 U.S.C. § 119 of Korean Patent Application 2005-13625 filed on Feb. 18, 2005, the entire contents of which are hereby incorporated by reference.

BACKGROUND OF THE INVENTION

1. Technical Field

The present invention relates to USB control systems, and more particularly, to an apparatus and method for controlling a power-saving (suspending) mode in a USB control system, reducing current consumption by suspending the power supplied to internal blocks during the suspending mode.

2. Discussion of Related Art

The Universal Serial Bus (USB) was developed for purpose of regularizing interface protocols to connect personal computers with peripheral devices such as mice, printers, modems, speakers, and so forth. USB functions as a kind of serial port. USB was proposed by a consortium of PC manufacturers including Intel, Compaq, Microsoft, Philips, IBM, and NEC.

The USB specification makes it possible to communicate with a peripheral device of a computer or hosting system without needing complicated adaptors for peripheral devices. Many hosting systems, e.g., personal computers, are equipped with a USB post as a standard serial port.

A data rate of a conventional serial port is not over 100 Kbps (kilobits per second). A data rate of a typical USB is 127 Mbps (megabits per second). Thus, the USB is able to provide a relatively high-speed data transmission environment for peripheral devices connected thereto. In addition, the USB is capable of connecting up to 127 devices in a chain. Further, a peripheral device cooperated with the host through the USB is operable without an additional power supply. As the USB is available for simultaneously use by a plurality of peripheral devices on the same interconnection without specifically establishing software or hardware connections between a host and the peripheral devices, a smaller number of ports may be used, convenient system installation is enabled, portable devices including a USB may be made small, and so on.

An apparatus for conducting an interfacing operation with a host such as a personal computer by way of the USB may be called a USB device. The USB device may have a USB controller for operating functions needed from the host. For USB devices used in portable applications, power consumption becomes an important issue. Therefore, many USB controllers are forced into a power-saving mode (e.g., a suspending mode) when there is no operation request from the host during active modes thereof, reducing unneeded power consumption.

FIG. 1 is a block diagram of a USB control system 100.

Referring to FIG. 1, the USB control system 100 comprises a host 120 and a USB controller for performing instructions requested from the host 120.

The USB controller includes a voltage controller 110, a physical layer (PHY) unit 130, a link unit 140, and a microcontrol unit (MCU) 150. The PHY unit 130 includes a PHY analog block 131 and a PHY digital block 133. The PHY analog block 131 includes an input/output block 135 and a phase-locked loop (PLL) 137.

The voltage controller 110 receives an external voltage EXT_VDD and a reference voltage VREF, and generates an internal voltage INT_VDD. The blocks within the USB controller are operable using the internal voltage INT_VDD as a voltage source. If there is an operation request from the host 120, the input/output block 135 transfers the received operation request, e.g., received data, to the PHY digital block 133 in synchronization with a clock signal CLK generated from the PLL 137. The PHY digital block 133 decodes the transferred data to abstract effective data and transfers the abstracted effective data to the MCU 150. The MCU 150 executes an operation for analyzing the request of the host 120 in accordance with the effective data.

If there is no operation request from the host 120 during a predetermined time, the USB controller is put into the suspending mode, reducing current consumption therein. In the suspending mode, the input/output block 135 is deactivated and the PLL 137 stops generating the clock signal CLK. Without the supply of the clock signal CLK, the PHY digital block 133 and the link unit 140, being composed of pure digital logic circuits, are deactivated, reducing current consumption therein. Further, the MCU 150 detects the suspending mode through an interrupt condition and is put into the suspending mode by itself.

However, the USB controller shown in FIG. 1 enables a leakage current to flow there through, wherein the internal voltage INT_VDD is supplied to all the internal circuit blocks or units. As a result, power consumption continues in the suspending mode and a current level may exceed a maximum current level defined in the USB Specification.

Therefore, a need exists for an apparatus and method for controlling a power-saving mode in a USB control system.

SUMMARY OF THE INVENTION

According to an embodiment of the present invention, a USB control system comprises a first voltage adjuster, a control switch, a second voltage adjuster, and a PHY unit. The first voltage adjuster receives an external voltage and a reference voltage and generates a first internal voltage. The control switch supplies and interrupts the external voltage. The second voltage adjuster receives the reference voltage and the external voltage supplied through the control switch and generates a second internal voltage. The PHY unit receives a request from a host, using one of the first and second internal voltages as a power source.

According to an embodiment of the present invention, a method for controlling a suspending mode in a USB control system comprises receiving a request from a host, changing an operation to the suspending mode in response to an absence of another request from the host for a predetermined time, supplying a first internal voltage in the suspending mode, and interrupting a second internal voltage in the suspending mode, in accordance with internal blocks of the system.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified. In the figures.

DETAILED DESCRIPTION OF PREFERRED EMBODIMENTS

Preferred embodiments of the invention will be described below in more detail with reference to the accompanying drawings. The invention may, however, be embodied in different forms and should not be constructed as limited to embodiments set forth herein. Rather, embodiments are provided so that this disclosure will be thorough and complete, and will fully convey the scope of the invention to those skilled in the art.

In this description, references to USB relate to the USB Specification Revision 2.0 dated on Apr. 27, 2000. However, one of ordinary skill in the art would appreciate, in view of the present disclosure, that the teachings may be applied to other specifications.

Figure 1:
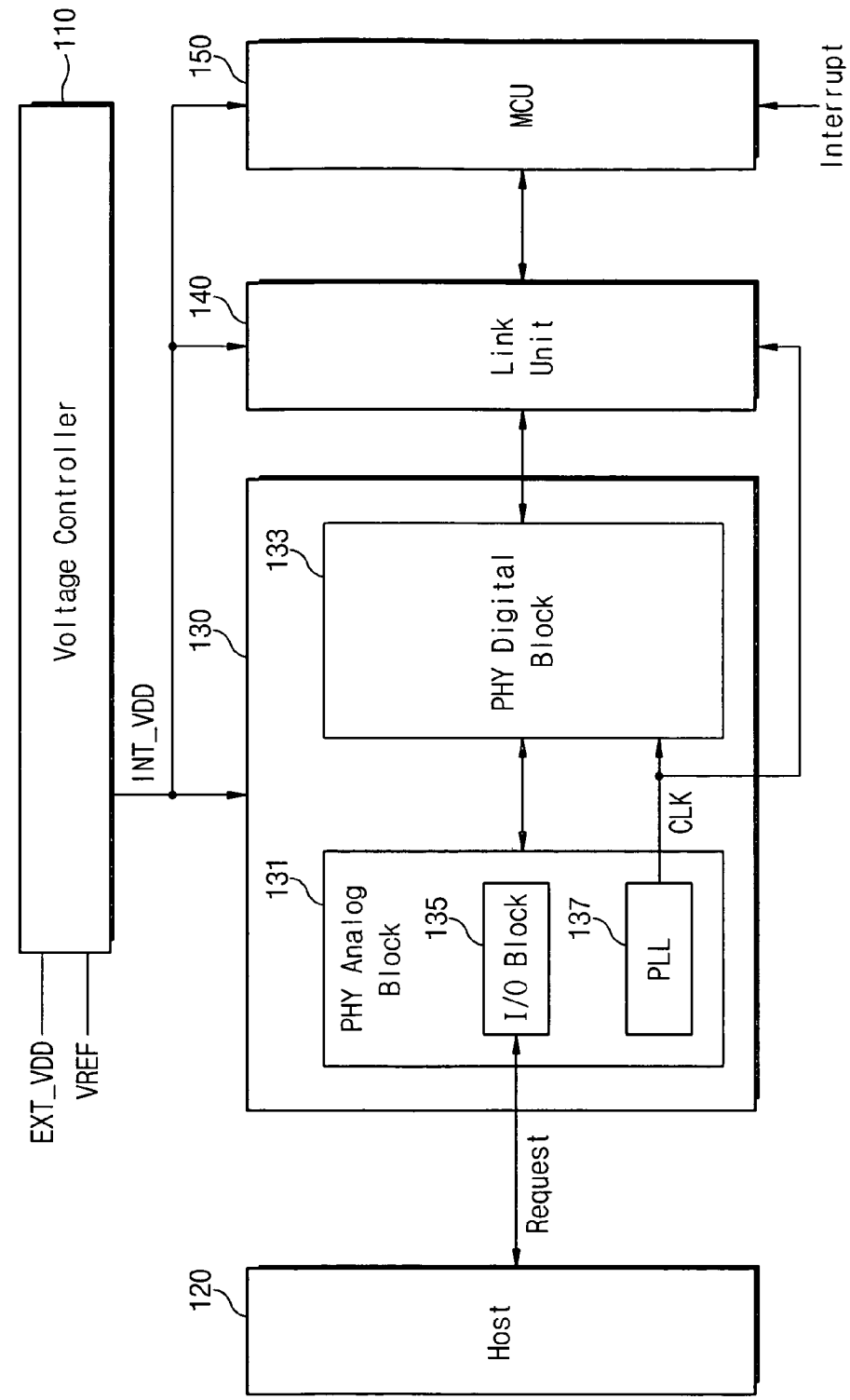
FIG. 1 is a block diagram of a USB control system.
Figure 2:
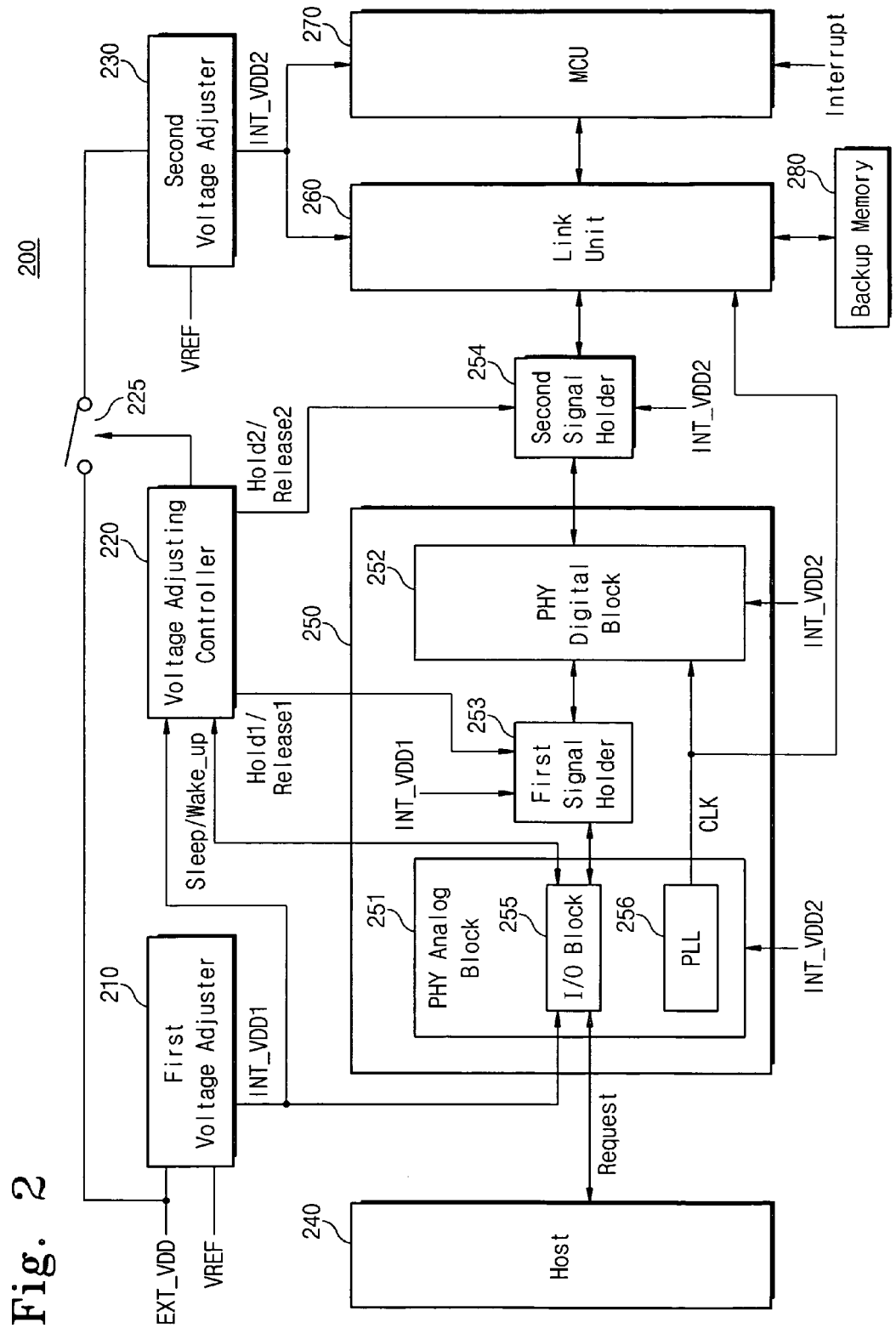
FIG. 2 is a block diagram illustrating a USB control system in accordance with an embodiment of the present invention.

FIG. 2 is a block diagram illustrating a USB control system 200 in accordance with an embodiment of the present invention.

Referring to FIG. 2, the USB control system 200 is comprised of a host 240 and a USB controller for performing instructions requested by the host 240.

The host 240 may be a personal computer, a digital camera, a digital camcorder, an MP3 player, a personal digital assistant, etc.

The USB controller is comprised of a first voltage adjuster 210, a voltage adjusting controller 220, a control switch 225, a second voltage adjuster 230, a PHY unit 250, a second signal holder 254, a link unit 260, an MCU 270, and a backup memory 280. The PHY unit 250 is comprised of a PHY analog block 251 for performing an interfacing operation with the host 240, a PHY digital block 252 outputting PHY data from decoded requesting data provided by the PHY analog block 251, and a first signal holder 253. The PHY analog block 251 includes an input/output block 255 for receiving an operation request from the host 240, and a PLL 256 for supplying a clock signal CLK to the PHY digital block 252 and the link unit 260 in an active mode or a resuming mode.

If there is an operation request from the host 240, the input/output block 255 transfers the received operation request, e.g., received data, to the PHY digital block 252 in synchronization with the clock signal CLK generated from the PLL 256. The PHY digital block 252 decodes the transferred data and outputs PHY data. The PHY data is transferred to the link unit 260. The link unit 260 analyzes the PHY data to abstract effective data and transfers the abstracted effective data to the MCU 270. The MCU 270 executes an operation requested by the host 240 in accordance with the effective data.

If there is no operation request from the host 240 during a predetermined time, the USB controller is put into the suspending mode to reduce current consumption therein. In the suspending mode, the input/output block 255 is deactivated and the PLL 256 stops generating the clock signal CLK. Without the supply of the clock signal CLK, the PHY digital block 252 and the link unit 260, being composed of pure digital logic circuits, are deactivated, reducing current consumption therein. Further, the MCU 270 detects the suspending mode through an interrupt condition and is put into the suspending mode by itself.

According to an embodiment of the present invention, a USB control system is configured to interrupt a power supply to other circuit blocks while continuing to power circuit blocks needed for changing an operation mode from the suspending mode to the resuming mode. This function is implemented using the first and second voltage adjusters 210 and 230, the control switch 225, and the voltage adjusting controller 230.

The first voltage adjuster 210 receives an external voltage EXT_VDD and a reference voltage VREF and outputs a first internal voltage INT_VDD1. The first internal voltage INT_VDD1 is supplied during the suspending mode and functions as a voltage source during the resuming mode. The second voltage adjuster 230 receives the reference voltage VREF and the external voltage EXT_VDD supplied or interrupted thereto by an operation of the control switch 235, and outputs a second internal voltage INT_VDD2. The second internal voltage INT_VDD2 is supplied in the active or resuming mode. The second internal voltage INT_VDD2 is interrupted in the suspending mode, reducing current consumption by the internal circuit blocks or units. The control switch 235 is shorted and supplies the external voltage EXT_VDD to the second voltage adjuster 230 in the active mode when there is a request from the host 240. The control switch 235 is opened to disconnect the external voltage EXT_VDD from the second voltage adjuster 230 in the suspending mode when there is no request from the host 240. The voltage adjusting controller 220 regulates the short and open conditions of the control switch 235 in response to a request accepted through the input/output block 255.

The configuration of power supply is divided into the first internal voltage INT_VDD1 that is supplied to the internal circuit blocks, including during the suspending mode, and the second internal voltage INT_VDD2 that is interrupted during the suspending mode, under control of the voltage adjusting controller 220, substantially preventing power consumption due to leakage currents.

Figure 3:
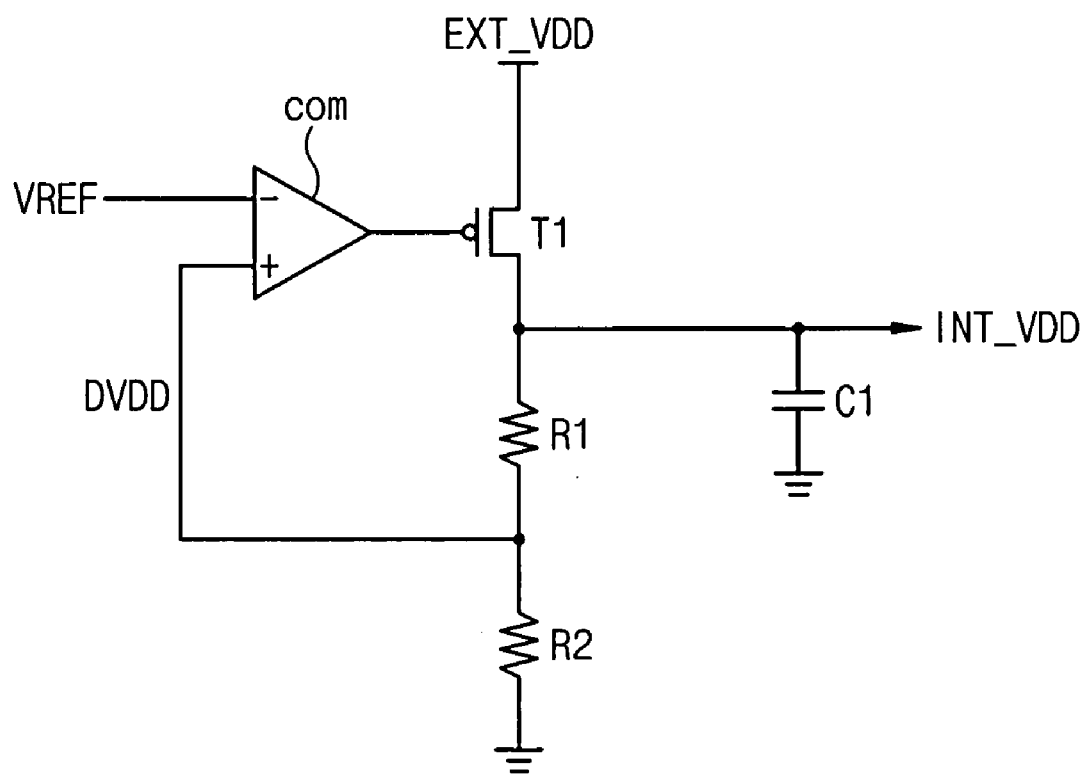
FIG. 3 is a circuit diagram of the first and second voltage adjusters in the USB control system shown in FIG. 2.

FIG. 3 is a circuit diagram of the first and second voltage adjusters in the USB control system shown in FIG. 2. While FIG. 3 illustrates that the first and second voltage adjusters are substantially the same in their internal circuit structures, they may be differently constructed from each other.

Referring to FIG. 3, the voltage adjuster, 210 or 230, is comprised of a comparator COM, a metal-oxide-semiconductor (MOS) transistor T1, resistors R1 and R2, and a capacitor C1. The comparator COM detects a difference between the reference voltage VREF and a voltage DVDD divided by the resistors R1 and R2, controlling the MOS transistor T1 so as to make the external voltage EXT_VDD less than or equal to the reference voltage VREF. Therefore, the internal voltage supplied to the internal circuit blocks or units, INT_VDD2 or INT_VDD2, is maintained at a constant level regardless of a level of the external voltage EXT_VDD. As the circuit pattern of the voltage adjuster 210 or 230 is well known by those skilled in this art, further detailed descriptions is omitted.

Referring to FIGS. 2 and 3, when there is an operation request from the host 240, e.g., in the active mode of the USB control system, the input/output block 255 of the PHY unit 250 sends a mode conversion signal WAKE_UP to the voltage adjusting controller 220. The voltage adjusting controller 220 shorts the control switch 235, supplying the external voltage EXT_VDD to the second voltage adjuster 230. Accordingly, data received from the host 240 is transferred to the PHY digital block 252 in synchronization with the clock signal CLK. The PHY digital block 252 decodes the transferred data and outputs PHY data. The PHY data is transferred to the link unit 260. The link unit 260 analyzes the PHY data to abstract effective data and transfers the abstracted effective data to the MCU 270. The MCU 270 executes an operation requested by the host 240 in accordance with the effective data.

If there is no operation request from the host 240 during a predetermined time, e.g., in the suspending mode of the USB control system, a mode conversion signal SLEEP is applied to the voltage adjusting controller 220. The voltage adjusting controller 220 opens the control switch 235, interrupting the supply of the external voltage EXT_VDD to the second voltage adjuster 230. Thus, the power supply to the internal circuit blocks that has been supplied as the second internal voltage INT_VDD2 is interrupted, reducing power consumption.

In the suspending mode, an operation request can be accepted from the host 240, wherein the input/output block 255 of the PHY analog block 251 is supplied the first internal voltage INT_VDD1. The voltage adjusting controller 220 is supplied the first internal voltage INT_VDD1 such that the control switch 235 can operate in response to the mode conversion signal of the input/output block 235.

The power supply to other circuit blocks, e.g., the PLL 256, the PHY digital block 252, the link unit 260, and the MCU 270, is interrupted and the second internal voltage INT_VDD2 is used as the power source.

In the suspending mode, while the input/output block 255 is electrically connected with the power supply, the power is not supplied to PHY digital block 252. Thus, signals between the input/output block 255 and the PHY digital block 252 would be conditioned in floating states.

To prevent the floating states of the signals, the USB control system according to an embodiment of the present invention employs the first signal holder 253 between the PHY analog block 251 and the PHY digital block 252. The first signal holder 253 maintains the signals between the PHY analog block 251 and the PHY digital block 252 at a specific voltage level in response to a first holding control signal HOLD1 of the voltage adjusting controller 220 when an operation mode changes to the suspending mode.

Another floating effect may be caused between the PHY digital block 252 and the link unit 260 because the power supply to the PHY digital block 252 and the link unit 260 is interrupted during the suspending mode.

To substantially prevent the signal floating effect between the PHY digital block 252 and the link unit 260, the USB control system according to an embodiment of the present invention employs the second signal holder 254 between the PHY digital block 252 and the link unit 260. The second signal holder 254 maintains the signals between the PHY digital block 252 and the link unit 260 at a specific voltage level in response to a second holding control signal HOLD2 of the voltage adjusting controller 220 when an operation mode changes to the suspending mode.

The first and second signal holders, 253 and 254, are supplied with the first internal voltage INT_VDD to maintain the signals among the blocks, e.g., between the PHY analog block 251 and the PHY digital block 252, and between the PHY digital block 252 and the link unit 260, each at specific voltage levels.

The USB control system according to an embodiment of the present invention employs the backup memory 280 for reserving state data stored in the link unit 260. With the backup memory 280, the USB control system can recover to a previous operating condition when an operation mode changes to the resuming mode from the suspending mode. The backup memory 280 may be used with a nonvolatile memory such as an EEPROM or a NAND flash memory.

If the input/output block 255 receives a new operation request from the host 240, e.g., in the resuming mode of the USB control system, the mode conversion signal WAKE_UP is applied to the voltage adjusting controller 220. The voltage adjusting controller 220 shorts the control switch 235 in response to the mode conversion signal WAKE_UP, re-supplying the external voltage EXT_VDD to the second voltage adjuster 230.

At the time of changing to the resuming mode, the signals among the internal circuit blocks or units are conductive along a predetermined sequence in accordance with the state data stored in the backup memory 280.

For the sequential operations by the signals in the resuming mode, the first signal holder 253 controls the signals between the PHY analog block 251 and the PHY digital block 252 to be operable in the predetermined sequence in response to the first holding control signal RELEASE1 of the voltage adjusting controller 220. The second signal holder 254 controls the signals between the PHY digital block 252 and the link unit 260 to be operable in the predetermined sequence in response to the second holding control signal RELEASE2 of the voltage adjusting controller 220.

Therefore, the configuration of power supply is divided into the first internal voltage INT_VDD1 that is supplied to the internal circuit blocks, including during the suspending mode, and the second internal voltage INT_VDD2 that is interrupted during the suspending mode, substantially preventing power consumption due to leakage currents. Furthermore, it is possible to perform the operational conversion with the suspending and resuming modes in more stable conditions, by substantially preventing the floating effects of the signals among the blocks in the suspending mode and by controlling the signals to be operable in the predetermined sequences when an operation mode changes to the resuming mode.

Figure 4:
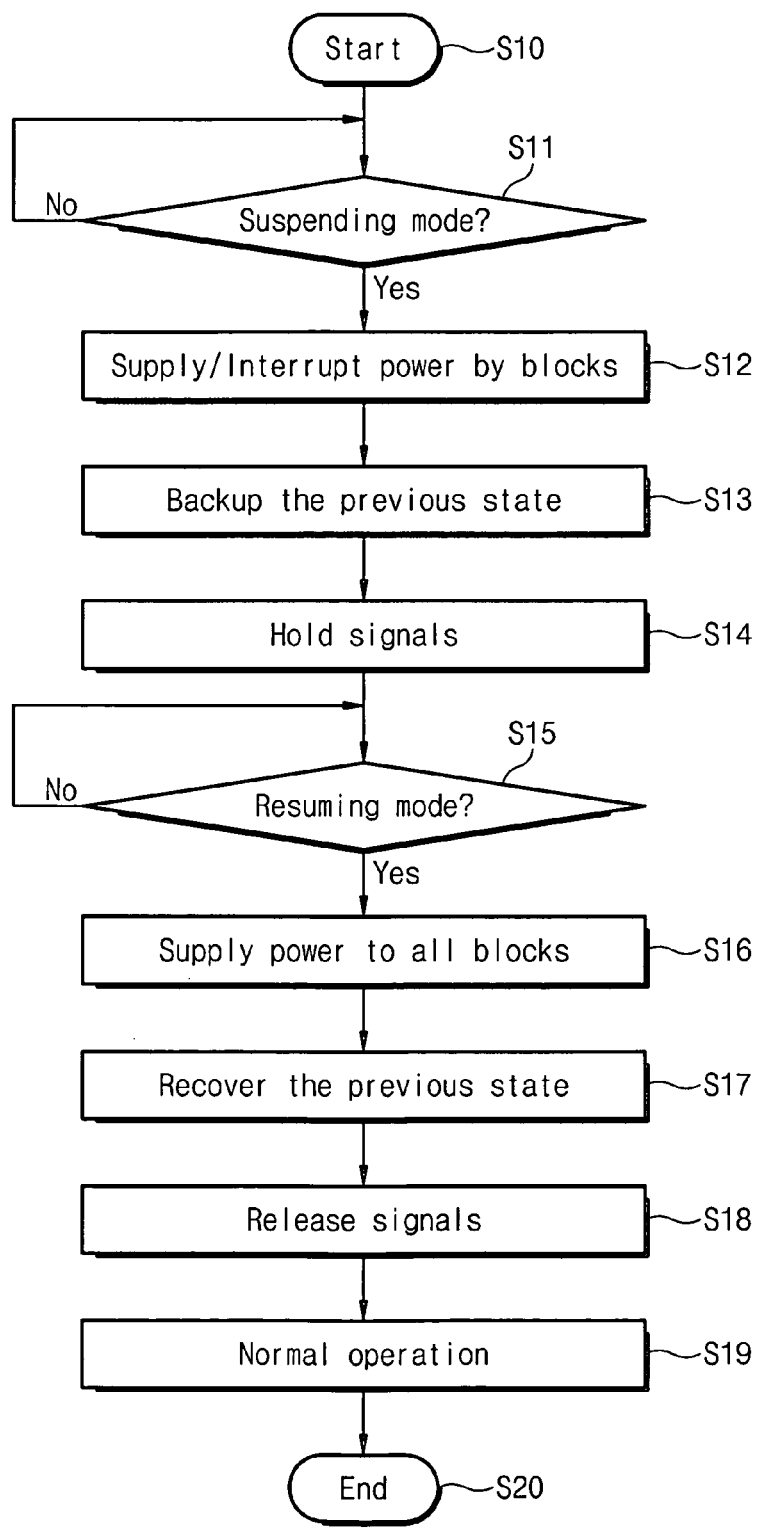
FIG. 4 is a flow chart showing the method for controlling a suspend mode in the USB control system in accordance with an embodiment of the present invention.

FIG. 4 is a flow chart showing the method for controlling a suspend mode in the USB control system in accordance with an embodiment of the present invention.

Referring to FIG. 4, it is determined whether there is an operation request from the host 240 (step S11). If there is no operation request from the host 240 during a predetermined time, an operation mode changes to the suspending mode.

When the suspending mode is changed into the resuming mode, the backup memory 280 reserves the stat data for the rapid recovery to the previous state (step S12), and the signal holders 253 and 254 maintain the signals at specific voltage levels for stable operations of the signals among the internal blocks in the suspending mode (step S13).

For reducing the power consumption, the voltage adjusting controller 220 enables the divisional power supply with the first internal voltage INT_VDD1 that is supplied during the suspending mode, and the second internal voltage INT_VDD2 that is interrupted during the suspending mode, being differentiated in accordance with the internal blocks or units (step S14).

It is determined whether there is an operation request from the host 240 (step S15). If there is the operation request from the host 240, an operation mode changes into the resuming mode. Responding to the change into the resuming mode, the voltage adjusting controller 220 resumes the power supply of the second internal voltage INT_VDD2 (step S16).

The backup state data is restored (step S17), and the voltage adjusting controller 220 enables the operation of the signals between the blocks in the predetermined sequences (step S18). Thereby, the USB controller performs its operations (step S19).

While there has been illustrated and described what are presently considered to be example embodiments of the present invention, it will be understood by those skilled in the art that various other modifications may be made, and equivalents may be substituted, without departing from the scope of the invention. Additionally, modifications may be made to adapt a particular situation to the teachings of the present invention without departing from inventive concepts described herein. Therefore, it is intended that the present invention not be limited to embodiments disclosed.

What is claimed is:

1. A bus control system comprising:
   a first voltage adjuster receiving an external voltage and a reference voltage and generating a first internal voltage;
   a control switch controlling a supply and an interruption of the external voltage;
   a second voltage adjuster receiving the reference voltage and the external voltage and generating a second internal voltage, wherein the external voltage received by the first adjuster is selectively supplied to the second voltage adjuster through the control switch; and
   a physical interface (PHY) unit receiving a request from a host, using one of the first and second internal voltages as a power source.

2. The bus control system as set forth in claim 1, wherein the first internal voltage is supplied during a suspending mode and the second internal voltage is interrupted during the suspending mode.

3. The bus control system as set forth in claim 2, which further comprises a voltage adjusting controller generating a signal to operate the control switch.

4. The bus control system as set forth in claim 3, wherein the voltage adjusting controller controls the control switch in response to a mode conversion signal of the PHY unit.

5. The bus control system as set forth in claim 4, wherein the voltage adjusting controller opens the control switch when the mode conversion signal is conditioned for a sleep mode, and closes the control switch when the mode conversion signal is conditioned for a wake-up mode.

6. The bus control system as set forth in claim 3, wherein the voltage adjusting controller is operable with the first internal voltage as a voltage source.

7. The bus control system as set forth in claim 3, wherein the PHY unit comprises:
   a PHY analog block for performing an interfacing operation with the host;
   a PHY digital block decoding the request of the host received from the PHY analog block and outputting PHY data; and
   a first signal holder maintaining signals between the PHY analog block and the PHY digital block at a specific voltage in response to a first holding control signal of the voltage adjusting controller.

8. The bus control system as set forth in claim 7, wherein the first signal holder maintains the signals between the PHY analog block and the PHY digital block in response to the first holding control signal of the voltage adjusting controller when an operation mode changes to a suspending mode.

9. The bus control system as set forth in claim 7, wherein the first signal holder controls the signals between the PHY analog block and the PHY digital block to be operable in a predetermined sequence in response to the first holding control signal of the voltage adjusting controller when an operation changes to a resuming mode.

10. The bus control system as set forth in claim 9, wherein the first signal holder uses the first internal voltage as a voltage source.

11. The bus control system as set forth in claim 7, which further comprises:
    a link unit analyzing the PHY data to abstract effective data; and
    a micro-control unit performing an operation in accordance with the effective data.

12. The bus control system as set forth in claim 11, wherein the link unit and the micro-control unit use the second internal voltage as voltage sources.

13. The bus control system as set forth in claim 7, wherein the PHY analog block comprises an input/output block receiving the request from the host; and
    a phased-locked loop PLL supplying a clock signal to the PHY digital block and the link unit in an active mode and the resuming mode.

14. The bus control system as set forth in claim 13, wherein the input/output block uses the first internal voltage as a voltage source and the PHY digital block and the PLL use the second internal voltage as voltage sources.

15. The bus control system as set forth in claim 7, which further comprises a second signal holder maintaining signals between the PHY digital block and the link unit at a specific voltage in response to a second holding control signal of the voltage adjusting controller.

16. The bus control system as set forth in claim 15, wherein the second signal holder maintains the signals between the PHY digital block and the link unit at the specific voltage in response to the second holding control signal of the voltage adjusting controller when an operation changes to the suspending mode.

17. The bus control system as set forth in claim 16, wherein the second signal holder controls the signals between the PHY digital block and the link unit to be operable in a predetermined sequence in response to the second holding control signal of the voltage adjusting controller when an operation changes to a resuming mode.

18. The bus control system as set forth in claim 15, wherein the second signal holder uses the first internal voltage as a voltage source.

19. The bus control system as set forth in claim 7, which further comprises a backup memory reserving state data stored in the link unit when an operation changes to the suspending mode.

20. The bus control system as set forth in claim 19, wherein the backup memory is a NAND flash memory.

21. A method for controlling a suspending mode in a bus control system, comprising:
    receiving a request from a host;
    turning an operation to the suspending mode in response to an absence of another request from the host for a predetermined time;
    supplying a first internal voltage to a first circuit of the bus control system always in the suspending mode; and
    interrupting a second internal voltage to a second circuit of the bus control system in the suspending mode, in accordance with internal blocks of the system.

22. The method as set forth in claim 21, which further comprises reserving state data.

23. The method as set forth in claim 22, which further comprises maintaining signals among internal blocks at a specific voltage in the suspending mode.

24. The method as set forth in claim 23, which further comprises supplying the second internal voltage, restoring the state data reserved, and controlling the signals among the internal blocks operable in a predetermined sequence, when an operation changes to a resuming mode.

* * * * *